(12) United States Patent
Goto et al.

(10) Patent No.: US 6,874,943 B2
(45) Date of Patent: Apr. 5, 2005

(54) ANTIFRICTION BEARING AND PROCESS FOR PRODUCING OUTER RACE FOR USE IN ANTIFRICTION BEARING

(75) Inventors: Masao Goto, Habikino (JP); Katsuhiko Kizawa, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 177 days.

(21) Appl. No.: 10/308,059

(22) Filed: Dec. 3, 2002

(65) Prior Publication Data

US 2003/0103702 A1 Jun. 5, 2003

(30) Foreign Application Priority Data

Dec. 5, 2001 (JP) ........................................ 2001-370855

(51) Int. Cl.[7] .............................................. F16C 33/58
(52) U.S. Cl. ...................... 384/625; 384/492; 384/569
(58) Field of Search ................................ 384/625, 492, 384/569

(56) References Cited

U.S. PATENT DOCUMENTS

| | | | |
|---|---|---|---|
| 3,682,519 A | * | 8/1972 | Shepelyakovsky et al. . 384/625 |
| 4,992,111 A | | 2/1991 | Yamada et al. |
| 5,780,165 A | * | 7/1998 | Fukumoto et al. ....... 428/472.1 |
| 6,267,511 B1 | | 7/2001 | Takemura et al. |
| 6,478,893 B1 | * | 11/2002 | Takemura ................... 148/320 |
| 6,601,993 B2 | * | 8/2003 | Tanaka ........................ 384/492 |

FOREIGN PATENT DOCUMENTS

| | | |
|---|---|---|
| DE | 195 24 957 A1 | 1/1997 |
| EP | 1 138 795 A1 | 10/2001 |
| WO | WO 00/06790 | 2/2000 |

* cited by examiner

Primary Examiner—William C. Joyce
(74) Attorney, Agent, or Firm—Oblon, Spivak, McClelland, Maier & Neustadt, P.C.

(57) ABSTRACT

An antifriction bearing comprises an inner race, an outer race having an outer peripheral surface to be brought into contact with other member for use as a roll, and a plurality of rolling elements arranged between the inner and outer races. The portion of the outer race from an outer peripheral surface thereof to a depth of 3 mm has a hardness of 58 to 62 in Rockwell C hardness (hereinafter referred to as "HRC") and a hardness gradient of up to 1 HRC/1 mm from the outer peripheral surface inward, and contains 5 to 18 vol. % of retained austenite. The portion of the outer race from an inner peripheral surface thereof to a depth of 1 mm has a hardness of 61 to 64 in HRC and contains 5 to 15 vol. % of retained austenite. The center portion of the thickness of the outer race between the inner and outer peripheral surfaces thereof has a hardness of 35 to 42 in HRC. The outer race can be prevented from cracking or breaking and from undergoing plastic deformation due to use for a short period of time.

3 Claims, 3 Drawing Sheets

DISTANCE FROM OUTER RACE OUTER PERIPHERY (mm)

ANTIFRICTION BEARING AND PROCESS FOR PRODUCING OUTER RACE FOR USE IN ANTIFRICTION BEARING

BACKGROUND OF THE INVENTION

The present invention relates to antifriction bearings comprising an inner race, an outer race having an outer peripheral surface to be brought into contact with other member for use as a roll, and rolling elements arranged between the inner and outer races, and to a process for producing an outer race for use in antifriction bearings.

The outer races of antifriction bearings are used, for example, as backup rolls in multistage rolling machines. Such antifriction bearings are generally used with a lubricant containing extraneous matter becoming mixed therewith. An elongated rolling fatigue life is of course required of these antifriction bearings for use under the lubricating conditions involving the use of a lubricant containing extraneous matter, while also required are the resistance of the outer race to breaking and the resistance of the outer race to plastic deformation due to the heat of or load on the outer race, because if the outer race breaks, the rolling line must be brought out of operation, and because the plastic deformation of the outer race impairs the quality of the rolled product. The rolling line is usually inspected periodically in order to avoid the stoppage of the line or the degradation of the rolled product, and the rolling bearings are replaced before becoming damaged or broken.

However, when the outer race of the antifriction bearing for use as a backup roll breaks or undergoes plastic deformation within a short period of time, there is a need to perform the periodic inspection in relatively short cycles and the inspection requires cumbersome work.

To prevent the breaking or plastic deformation of outer races, an outer race blank prepared from a bearing steel in a predetermined shape is conventionally carburized or carbonitrided to form a hardened surface layer of relatively great hardness over the outer periphery of the outer race and to impart toughness to the portion of the race inwardly of the surface layer.

The antifriction bearing having an outer race for use as the backup roll in multistage rolling machines is a bearing of high load capacity, and the outer peripheral surface of the outer race, if defaced, must be ground again to remove the defacement, hence the necessity of giving an increased thickness to the hardened surface layer.

The hardened surface layer having an increased thickness and formed by a carburizing or carbonitriding treatment nevertheless has the problem of requiring an elongated treating time and an increased production cost.

DISCLOSURE OF THE INVENTION

An object of the present invention is to overcome the above problem and to provide an antifriction bearing having an outer race which is usable without breaking or undergoing plastic deformation within a short period of time, and a process for producing an outer race for use in antifriction bearings at a reduced cost.

Another object of the invention is to provide an antifriction bearing wherein improved rolling fatigue life characteristics are given to the raceway surfaces of the inner and outer races thereof and to the rolling surfaces of the rolling elements, the outer race further having an outer peripheral surface of increased effective hardened layer depth and being inhibited in aging deformation.

The present invention provides an antifriction bearing comprising an inner race, an outer race having an outer peripheral surface to be brought into contact with other member for use as a roll, and a plurality of rolling elements arranged between the inner and outer races, the bearing being characterized in that a portion of the outer race from an outer peripheral surface thereof to a depth of 3 mm has a hardness of 58 to 62 in Rockwell C hardness (hereinafter referred to as "HRC") and a hardness gradient of up to 1 HRC/1 mm from the outer peripheral surface inward, the depth portion containing 5 to 18 vol. % of retained austenite, a portion of the outer race from an inner peripheral surface thereof to a depth of 1 mm having a hardness of 61 to 64 in HRC and containing 5 to 15 vol. % of retained austenite, a center portion of the thickness of the outer race between the inner and outer peripheral surfaces thereof having a hardness of 35 to 42 in HRC.

With the antifriction bearing of the present invention, the outer race thereof can be prevented from breaking within a short period of time due to the development of a surface crack thereof or from plastically deforming within a short period of time and can therefore be given a prolonged life.

With the antifriction bearing of the invention, an end face of the outer race may have a surface hardness of 45 to 59 in HRC except at an end face annular portion having a width of 3 mm from an outer periphery thereof and at an end face annular portion having a width of 1 mm from an inner periphery thereof.

Even if the end face of the outer race and a thrust washer adjacent thereto develop heat cracks in this case, the bearing can be prevented from breaking in its entirety.

The present invention provides another antifriction bearing comprising an inner race having an outer peripheral surface serving as a raceway surface, an outer race having an inner peripheral surface serving as a raceway surface and an outer peripheral surface to be brought into contact with other member for use as a roll, and a plurality of rolling elements arranged between the inner and outer races, the bearing being characterized in that the raceway surface of the inner race and the rolling surfaces of the rolling elements each have a surface hardness of 61 to 65 in HRC and an effective hardened layer having a depth of at least 0.35 mm and a hardness of 61 to 65 in HRC, the effective hardened layer containing 15 to 35 vol. % of retained austenite and having a compressive residual stress of at least 100 MPa, the outer race being made of a bearing steel, the raceway surface of the outer race being smaller than the rolling surfaces of the rolling elements in surface hardness, a portion of the outer race from the outer peripheral surface thereof to a depth of 3 mm having a hardness of 58 to 62 in HRC and containing 5 to 18 vol. % of retained austenite, a center portion of the thickness of the outer race between the inner and outer peripheral surfaces thereof having a hardness of 30 to 45 in HRC.

When the second-mentioned antifriction bearing of the invention is used, for example, as the backup roll of a multistage rolling machine, the raceway surfaces of the inner and outer races and the rolling surfaces of the rolling elements thereof exhibit improved rolling fatigue life characteristics. Further if the outer peripheral surface of the outer race is defaced, the defaced surface can be ground again effectively for the removal of the flaw. The invention further assures the outer race of diminished aging deformation due to the heat of or load on the outer peripheral surface of the outer race. The aforementioned hardness given to the center portion of the thickness of the outer race between the inner and outer peripheral surfaces thereof serves to prevent the plastic deformation of the outer race.

The present invention provides a process for producing an outer race for use in antifriction bearings, i.e., the outer race of an antifriction bearing according to claim 1. The process is characterized in that an outer race blank prepared in a predetermined form from a steel containing 0.8 to 1.3 wt. % of C, 0.35 to 0.8 wt. % of Si, 0.3 to 1.2 wt. % of Mn and 0.9 to 1.5 wt. % of Cr, the balance being Fe and inevitable impurities, is heated at 800 to 880° C. for 1 to 3 hours and thereafter hardened in a quenching oil while injecting the quenching oil into the quenching oil against an inner peripheral surface of the blank at a pressure of 0.2 to 0.8 kg/cm$^2$ and similarly injecting the quenching oil against an outer peripheral surface of the blank at a pressure of 1.4 to 2.1 kg/cm$^2$.

The process of the invention is adapted to produce an antifriction bearing outer race wherein a portion thereof from an outer peripheral surface thereof to a depth of 3 mm has a hardness of 58 to 62 in HRC and a hardness gradient of up to 1 HRC/1 mm from the outer peripheral surface inward, the depth portion containing 5 to 18 vol. % of retained austenite, a portion of the outer race from an inner peripheral surface thereof to a depth of 1 mm having a hardness of 61 to 64 in HRC and containing 5 to 15 vol. % of retained austenite. The outer race blank is heated at 800 to 880° C. for 1 to 3 hours and thereafter treated merely by hardening the blank in the quenching oil, injecting the quenching oil into the oil against the inner peripheral surface of the blank at a pressure of 0.2 to 0.8 kg/cm$^2$ and similarly injecting the quenching oil against the outer peripheral surface of the blank at a pressure of 1.4 to 2.1 kg/cm$^2$. Accordingly, the outer race can be produced at a lower cost than the conventional process including a carburizing or carbonitriding treatment.

In the process of the invention for producing the antifriction bearing outer race, an end face of the outer race blank to be hardened in the quenching oil may be covered with a ring of steel material over a portion thereof other than an end face annular portion having a width of 3 mm from the outer periphery thereof and an end face annular portion having a width of 1 mm from the inner periphery thereof. The hardness of the ring-covered portion of the end face of the outer race blank resulting from the hardening treatment is then adjustable by suitably adjusting the thickness of the ring. This makes it possible to give the ring-covered portion a lower hardness than the inner and outer peripheral surfaces of the outer race as hardened, i.e., a hardness of 45 to 59 in HRC. For example, in the case where the ring is 5 mm in thickness, the ring-covered portion of each end face of the outer race as hardened is given a hardness corresponding to the hardness of the portion thereof at a depth of 5 mm from the surface that would result in the absence of the covering ring.

DESCRIPTION OF THE PREFERRED EMBODIMENTS

A first embodiment of antifriction bearing of the invention will be described below.

Figure 1:
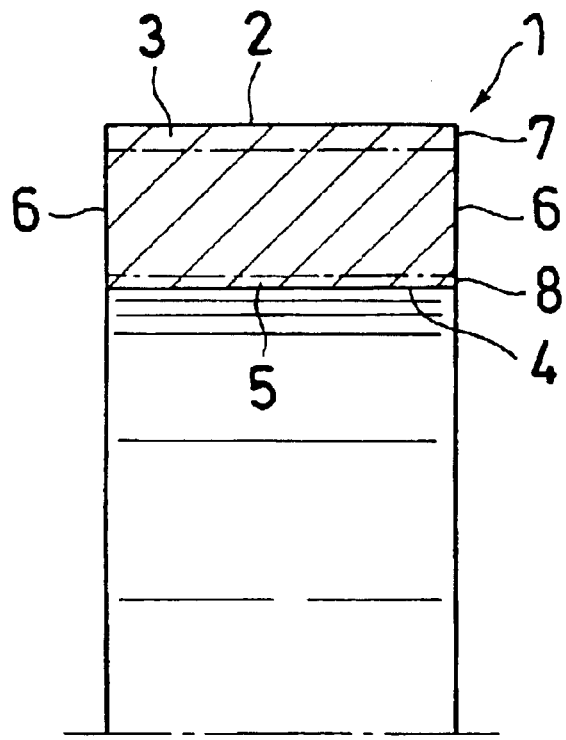
FIG. 1 is a view in vertical section showing a half of the outer race of an antifriction bearing according to a first embodiment.

With reference to FIG. 1 showing the outer race of an antifriction bearing for use as a backup roll in a multistage rolling machine, a portion 3 of the outer race 1 from the outer peripheral surface 2 thereof to a depth of 3 mm has a hardness of 58 to 62 in HRC and a hardness gradient of up to 1 HRC/1 mm from the outer peripheral surface 2 inward. A portion 5 of the outer race 1 from the inner peripheral surface 4 thereof to a depth of 1 mm has a hardness of 61 to 64 in HRC. The center portion of the thickness of the outer race 1 between the inner and outer peripheral surfaces 4, 2 thereof has a hardness of 35 to 42 in HRC. The outer race 1 has such a distribution of hardnesses in the direction of its thickness that the hardness in terms of HRC of the race gradually decreases from the inner and outer peripheral surfaces 4, 2 toward the center portion of the thickness and varies smoothly. The portion 3 of the outer race 1 from the outer peripheral surface 2 thereof to a depth of 3 mm contains 5 to 18 vol. % of retained austenite, and the portion 5 of the outer race 1 from the inner peripheral surface 4 thereof to a depth of 1 mm contains 5 to 15 vol. % of retained austenite.

Each of opposite end faces 6 of the outer race 1 has a surface hardness of 45 to 59 in HRC except at an annular portion 7 having a width of 3 mm from the outer periphery thereof and at an annular portion 8 having a width of 1 mm from the inner periphery thereof.

The numerical values as to the outer race 1 are thus limited for the following reasons.

Hardness of Portion of Outer Race from its Outer Periphery to Depth of 3 mm

The reason is that if the hardness is less than 58 in HRC, the outer race is susceptible to plastic deformation, and that if the hardness is over 62 in HRC, the race is liable to crack.

Hardness Gradient of Portion of Outer Race from its Outer Periphery to Depth of 3 mm If this gradient is in excess of 1 HRC/1 mm, surface cracks will develop. To give improved resistance to breaking by preventing the development of surface cracks, it is effective to increase the compressive residual stress. To increase the compressive residual stress of the portion of the outer race from its outer peripheral surface to a depth of 3 mm, the hardness gradient must be up to 1 HRC/1 mm and uniform.

Retained Austenite Content of Portion of Outer Race from its Outer Periphery to Depth of 3 mm If the retained austenite content is less than 5 vol. %, insufficient toughness will result to entail lower resistance to breaking. If the content is over 18 vol. %, the outer race is susceptible to aging deformation to result in dimensional errors, and a portion of high bearing pressure is locally created to possibly cause a break.

The portion of the outer race from its outer peripheral surface to a depth of 3 mm is given the above-mentioned hardness, hardness gradient and retained austenite content so as to make the outer race, already used once, usable again.

While the outer race once used can be made usable again if ground (reground) over the outer peripheral surface thereof, the portion of the outer race from its outer peripheral surface to a depth of 3 mm needs to have the specified values with respect to the hardness, hardness gradient and retained austenite content if the outer race as ground again is to exhibit the desired performance.

Hardness of Portion of Outer Race from its Inner Periphery to Depth of 1 mm

If the hardness is less than 61 in HRC, extraneous matter is liable to produce impressions, whereas if the hardness is over 64, a break is liable to occur.

Retained Austenite Content of Portion of Outer Race from its Inner Periphery to Depth of 1 mm If the retained austenite content is less than 5 vol. %, insufficient toughness will result to entail lower resistance to breaking, and a shortened life will result due to the presence of extraneous matter. If the content is over 15 vol. %, the outer race is susceptible to aging deformation to result in dimensional errors, and a portion of high bearing pressure is locally created to possibly cause a break and to entail an impaired rolling life.

The portion of the outer race from its inner peripheral surface to a depth of 1 mm is given the above-mentioned hardness and retained austenite content because the maximum shear stress depth which governs the internally initiated peel life is up to 1 mm.

Hardness of Center Portion of Thickness of Outer Race Between Inner and Outer Peripheries If this hardness is less than 35 in HRC, the outer race is susceptible to plastic deformation and insufficient in strength, failing to serve, for example, as the backup roll of the multistage rolling machine. If the hardness is in excess of 42 in HRC, insufficient toughness will result to entail impaired resistance to breaking.

Surface Hardness of Portion of End Face of Outer Race Other than 3-mm-Wide Annular Portion Along Outer Periphery and 1-mm-Wide Annular Portion Along Inner Periphery The surface hardness of the portion of the end face is limited to 45 to 59 in HRC because if the hardness is less than 45 in HRC, the bearing outer race is insufficient in strength in its entirety, and further because if the hardness is over 59 in HRC, the outer race is insufficient in resistance to breaking.

The outer race 1 described above is produced by the process to be described below.

Figure 2:
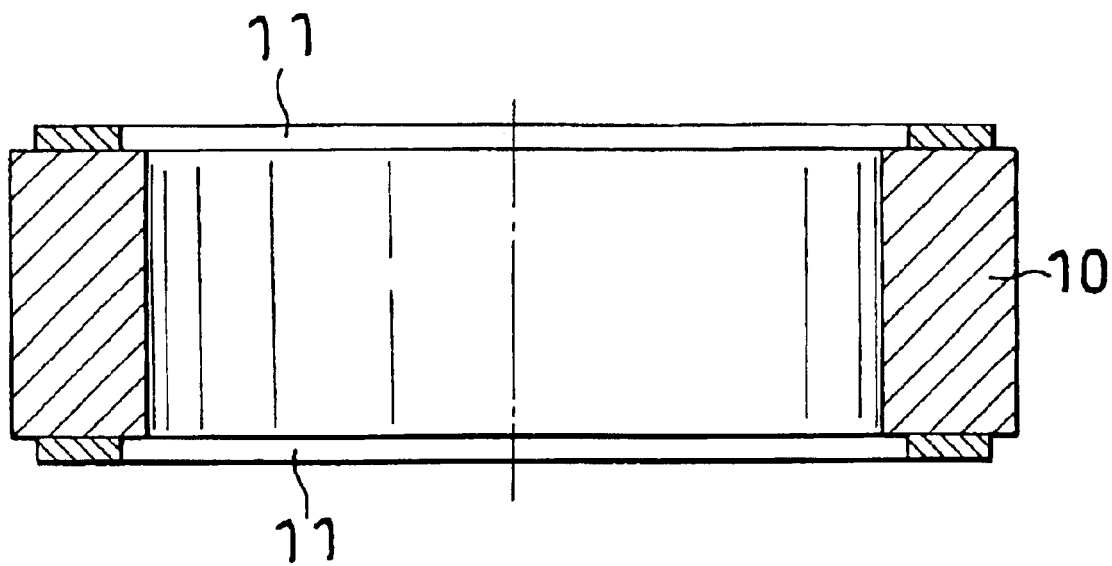
FIG. 2 is a view in vertical section showing rings as attached to a heated outer race blank.
Figure 3:
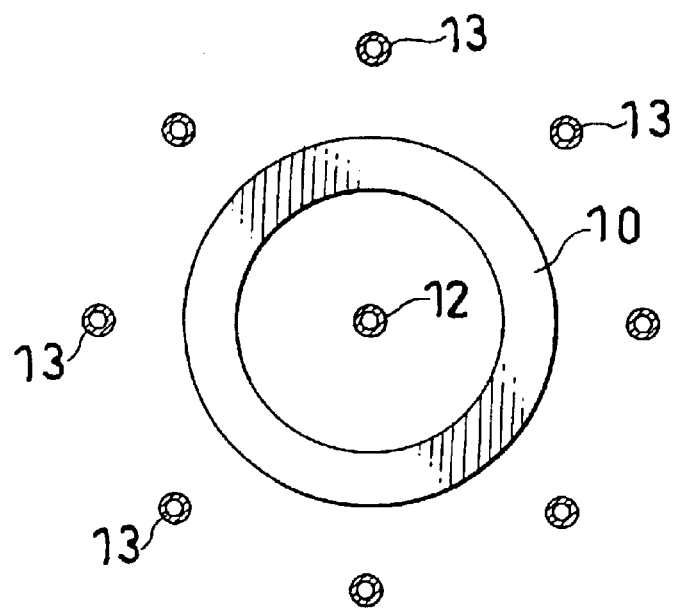
FIG. 3 is a diagram showing an arrangement of nozzles for injecting a quenching oil into the quenching oil against the outer race blank.

First, an outer race blank 10 is prepared from a steel containing 0.8 to 1.3 wt. % of C, 0.35 to 0.8 wt. % of Si, 0.3 to 1.2 wt. % of Mn and 0.9 to 1.5 wt. % of Cr, the balance being Fe and inevitable impurities, in a predetermined form. The blank 10 is then heated at 800 to 880° C. for 1 to 3 hours and thereafter hardened in a quenching oil. Before the hardening, each of opposite end faces of the outer race blank 10 is covered with a ring 11 of steel material over a portion thereof other than an end face annular portion having a width of 3 mm from the outer periphery thereof and an end face annular portion having a width of 1 mm from the inner periphery thereof as shown in FIG. 2, and the two rings 11 are fixed by unillustrated clips. Further arranged in the quenching oil for hardening as shown in FIG. 3 are a first quenching oil injection nozzle 12 extending axially of the blank 10 and positioned on the center axis of the blank 10 inside the inner periphery thereof, and second quenching oil injection nozzles 13 extending axially of the blank 10 and positioned around the outer periphery thereof respectively at locations equidistantly spaced apart circumferentially of the blank 10.

The quenching oil is forced out from the first injection nozzle 12 against the inner peripheral surface of the blank 10 at a pressure of 0.2 to 0.8 kg/cm$^2$, and is similarly forced out from the second injection nozzles 13 against the outer peripheral surface of the blank 10 at a pressure of 1.4 to 2.1 kg/cm$^2$.

After the completion of hardening, the outer race blank 10 is withdrawn from the quenching oil, the rings 11 are removed, and the blank is subjected to a tempering treatment.

Finally the inner and outer peripheral surfaces and opposite side faces of the blank 10 are cut as specified. In this way, the outer race 1 is produced.

The numerical values involved in the process for producing the outer race 1 are limited for the following reasons.

Type of Steel

C Content

C is an element essential for giving the bearing the strength required. If the content is less than 0.8 wt. %, it is difficult to give the desired hardness to each of the inner and outer peripheral surfaces of the outer race as hardened and tempered to entail a lower rolling life. If the content is over 1.3 wt. %, large carbide particles will be formed readily in the step of preparing the steel material by melting, consequently resulting in impaired workability, lower fracture resistance and an impaired rolling fatigue life.

Si Content

Si has properties to afford an improved rolling life. If less than 0.35 wt. % in content, however, Si fails to afford an effectively improved rolling life, whereas presence of more than 0.8 wt. % of Si gives a higher hardness after a softening heat treatment, entailing seriously impaired cuttability and greatly reduced malleability.

Mn Content

Mn is used as a deoxidizer, and has properties to afford improved hardenability and fracture resistance at the same time. If the content is less than 0.3 wt. %, the steel becomes costly to make by melting, whereas presence of more than 1.2 wt. % of Mn results in markedly impaired cuttability.

Cr Content

Cr has properties to afford improved hardenability, fracture resistance and rolling fatigue life. If the content is less than 0.9 wt. %, no effect to give improved fracture resistance and rolling life is available, whereas if the content is over 1.5 wt. %, large carbide particles will be formed to entail lower fracture resistance and an impaired rolling life undesirably.

Heating Temperature

If the heating temperature is lower than 800° C., it is impossible to give the desired hardness to each of the inner and outer peripheral surfaces of the outer race, while temperatures over 880° C. permit growth of coarse crystal grains and formation of an excess of solid solution of carbide as a second phase in the matrix, failing to afford the required rolling life and resistance to breaking.

Heating Time

If the heating time is shorter than 1 hour, a faulty heat treatment will result due to insufficient soaking, whereas if the heating time is in excess of 3 hours, an increased heat treatment cost will result.

Pressure for Injecting Quenching Oil Against Inner and Outer Peripheries of Outer Race Blank If the pressure for injecting the quenching oil against the inner and outer peripheral surfaces of the outer race blank is less than the lower limit value, the desired hardness can not be given to the inner and outer peripheral surfaces of the outer race, whereas if the pressure is in excess of the upper limit value, the interior of the race is given an excessive hardness of greater than 42 in HRC. The injection pressure is the pressure at the orifice of the injection nozzle. The orifices of the nozzles for forcing out the quenching oil against the outer peripheral surface of the outer race blank are preferably at a distance of 150 to 300 mm, more preferably at a distance of 200 to 250 mm, from the outer peripheral surface of the blank.

Next, an example is given below for the first embodiment of the invention.

A hollow cylindrical outer race blank 10, 300 mm in outside diameter, 220 mm in inside diameter and 170 mm in length, was prepared from a steel containing 1.02 wt. % of C, 0.55 wt. % of Si, 1.01 wt. % of Mn, 0.015 wt. % of P, 0.003 wt. % of S, 0.09 wt. % of Cu, 0.07 wt. % of Ni, 1.10 wt. % of Cr and 0.02 wt. % of Mo, the balance being Fe and inevitable impurities.

The outer race blank 10 was then heated at 860° C. for 100 minutes. Each of opposite end faces of the outer race blank 10 was thereafter covered with a 5-mm-thick ring 11 of JIS S45C over a portion thereof other than an end face annular portion having a width of 3 mm from the outer periphery thereof and an end face annular portion having a width of 1 mm from the inner periphery thereof, and the two rings 11 were fixed by unillustrated clips. Subsequently, the blank 10 was immersed in a quenching oil comprising Master Quench A and having a temperature of 80° C. for hardening while injecting the quenching oil into the oil bath from a first quenching oil injection nozzle 12 against the inner peripheral surface of the blank 10 at a pressure of 0.6 kg/cm$^2$, and similarly injecting the quenching oil from second quenching oil injection nozzles 13 against the outer peripheral surface of the blank 10 at a pressure of 1.9 kg/cm$^2$. The second injection nozzles 13 were eight in number. Table 1 shows the hardening conditions.

TABLE 1

| Heating conditions | Temperature (° C.) | | 860 |
|---|---|---|---|
| | Time (min) | | 100 |
| Hardening conditions | Method | | Injection into oil |
| | Number of oil injection nozzles | 1$^{st}$ nozzle | 1 |
| | | 2$^{nd}$ nozzles | 8 |
| | Distance (mm) of 2nd nozzle orifices from outer periphery of blank | | 220 |
| | Nozzle pressure (kg/cm$^2$) | 1st nozzle | 0.6 |
| | | 2$^{nd}$ nozzles | 1.9 |
| | Injection time (min) | | 6 |
| | Oil quenching time (min) | | 6 |

After the completion of hardening, the outer race blank 10 was withdrawn from the quenching oil, the rings 11 were removed, and the blank 10 was heated at 200° C. for 5 hours for tempering. The inner and outer peripheral surfaces and opposite side faces of the blank 10 were thereafter cut and ground as specified.

Figure 4:
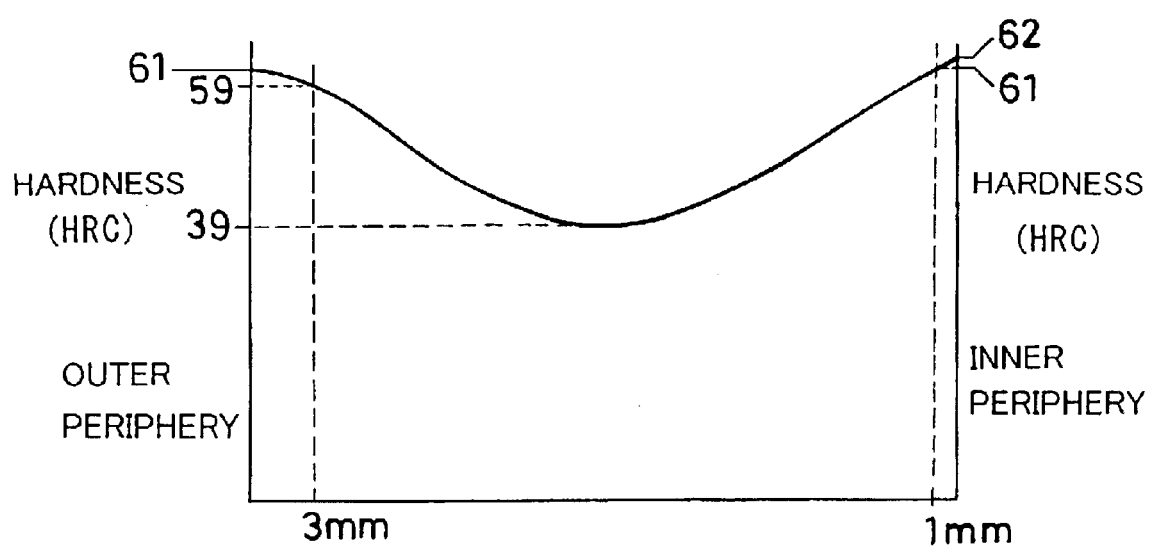
FIG. 4 is a graph showing a distribution of hardnesses in an outer race produced in an example of the first embodiment.

The distribution of hardnesses was measured of the outer race 1 thus produced, in the portion thereof from the outer peripheral surface 2 to the inner peripheral surface 4 at the center of the length of the race. As apparent from FIG. 4 showing the result, the outer peripheral surface 2 had a hardness of 61 in HRC, the portion 3 having a depth of 3 mm from the outer peripheral surface 2 had a hardness of 59 in HRC, and this portion 3 having a depth of 3 mm from the surface 2 had a hardness gradient of ⅔ HRC/1 mm from the surface 2 inward. The inner peripheral surface 4 had a hardness of 62 in HRC, the portion 5 having a depth of 1 mm from the surface 4 had a hardness of 61 in HRC, and the center of the thickness of the race had a hardness of 39 in HRC. Furthermore, the portion 3 having a depth of 3 mm from the outer peripheral surface 2 contained 11 vol. % of retained austenite, and the portion 5 having a depth of 1 mm from the inner peripheral surface 4 contained 13 vol. % of retained austenite.

Outer races 1 produced in the manner described above were used to assemble antifriction bearings, which were then incorporated into a multistage rolling machine with the outer races 1 serving as backup rolls. In this case, the outer races 1 were found free from breaks or plastic deformation even after 6 months of use, i.e., even after the period of use necessitating inspection and replacement when conventional outer races were used.

Next, a second embodiment of antifriction bearing of the invention will be described.

The antifriction bearing comprises an inner race having an outer peripheral surface serving as a raceway surface, an outer race having an inner peripheral surface serving as a raceway surface and useful as the backup roll of multistage rolling machines, and a plurality of cylindrical rollers arranged between the inner and outer races.

The inner race and the rollers are made of a case-hardened steel such as nickel-chromium-molybdenum steel or chromium-molybdenum steel. The raceway surface of the inner race and the rolling surfaces of the rolling elements each have a surface hardness of 61 to 65 in Rockwell C hardness (HRC) and an effective hardened layer having a depth of at least 0.35 mm and a hardness of 61 to 65 in HRC. The effective hardened layer contains 15 to 35 vol. % of retained austenite and has a compressive residual stress of at least 100 MPa.

Figure 5:
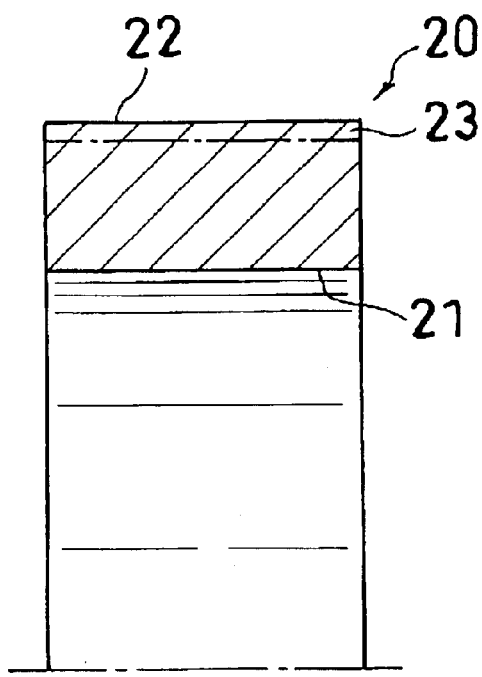
FIG. 5 is a view in vertical section showing a half of the outer race of an antifriction bearing according to a second embodiment.

With reference to FIG. 5, the outer race 20 is made of a bearing steel, and the inner peripheral surface 21 of the outer race 20, i.e., the raceway surface thereof, is smaller than the rolling surfaces of the rolling elements in surface hardness. The difference between the inner peripheral surface 21 of the outer race 20 and the rolling surface of each of the rollers in surface hardness is in the range of 0.8 to 1.3, for example 1, in HRC. The portion 23 of the outer race 20 from the outer peripheral surface 22 thereof to a depth of 3 mm has a hardness of 58 to 62 in HRC and contains 5 to 18 vol. % of retained austenite. The center portion of the thickness of the outer race 20 between the inner and outer peripheral surfaces 21, 22 thereof has a hardness of 30 to 45 in HRC. The outer race 20 has such a distribution of hardnesses in the direction of its thickness that the hardness in terms of HRC of the race gradually decreases from the inner and outer peripheral surfaces 21, 22 toward the center portion of the thickness and varies smoothly. The portion 23 of the outer race 20 from the outer peripheral surface thereof to a depth of 3 mm contains 5 to 18 vol. % of retained austenite.

The numerical values as to the antifriction bearing described above are thus limited for the following reasons.

Surface Hardness of Raceway Surface of Inner Race and Rolling Surfaces of Rolling Elements If the surface hardness is less than 61 in HRC, the extraneous matter in the lubricant is liable to produce impressions, whereas if the hardness is over 65 in HRC, a break is liable to occur.

Depth of Effective Hardened Layer in Raceway Surface of Inner Race and in Rolling Surfaces of Rolling Elements A depth of 0.35 mm is a minimum depth for effectively preventing the occurrence of impressions due to the presence of extraneous matter in the lubricant.

Retained Austenite Content of Effective Hardened Layer in Inner Race Raceway Surface and in Rolling Element Rolling Surfaces The retained austenite has properties to improve the toughness of matrix of the effective hardened layer to suppress the development of cracks, thereby giving an improved life despite the presence of extraneous matter, whereas this effect is not available if the residual austenite content is less than 15 vol. %. If the content is over 35 vol. %, deformation is liable to occur.

Compressive Residual Stress of Effective Hardened Layer in Inner Race Raceway Surface and in Rolling Element Rolling Surfaces If the compressive residual stress is less than 100 MPa, surface cracks are prone to develop in the inner race raceway surface and rolling element rolling surfaces.

Surface Hardness of Outer Race Raceway Surface

This surface hardness is made smaller than that of the rolling surfaces of the rolling members because the outer race which is prone to break must be improved in toughness by being given a lower hardness so as to give the antifriction bearing high resistance to breaking. In order to give the antifriction bearing a strength in balance with wear resistance so as to give improved durability to the bearing, it is desirable that the difference between the inner peripheral surface of the outer race and the rolling surface of the rolling element in surface hardness be in the range of 0.8 to 1.3, preferably 1, in HRC.

Hardness of Portion of Outer Race from its Outer Periphery to Depth of 3 mm

If the hardness is less than 58 in HRC, the outer race is susceptible to plastic deformation, whereas if the hardness is over 62 in HRC, a break is liable to occur.

Retained Austenite Content of Portion of Outer Race from its Outer Periphery to Depth of 3 mm If the retained austenite content is less than 5 vol. %, insufficient toughness will result to entail lower resistance to breaking. If the content is over 18 vol. %, the outer race is susceptible to aging deformation to result in dimensional errors, and a portion of high bearing pressure is locally created to possibly cause a break.

The portion of the outer race from its outer peripheral surface to a depth of 3 mm is given the above-mentioned hardness and retained austenite content because the outer race can then be ground again for the removal of defacement in its outer peripheral surface if the surface is defaced and further because the outer race can then be less susceptible to aging deformation due to heat or load.

Hardness of Center Portion of Thickness of Outer Race Between Inner and Outer Peripheries If this hardness is less than 30 in HRC, the outer race is susceptible to plastic deformation and insufficient in strength, failing to serve, for example, as the backup roll of the multistage rolling machine. If the hardness is in excess of 45 in HRC, insufficient toughness will result to entail impaired resistance to breaking. The hardness is preferably 35 to 42 in HRC.

As is the case with the foregoing first embodiment shown in FIGS. 2 and 3, the outer race 20 described is produced by the process to be described below.

First, an outer race blank is prepared from a steel containing 0.8 to 1.3 wt. % of C, 0.35 to 0.8 wt. % of Si, 0.3 to 1.2 wt. % of Mn and 0.9 to 1.5 wt. % of Cr, the balance being Fe and inevitable impurities, in a predetermined form.

The blank is then heated at 800 to 880° C. for 1 to 3 hours and thereafter hardened in a quenching oil. Arranged in the quenching oil before hardening are a first quenching oil injection nozzle extending axially of the blank and positioned on the center axis of the blank inside the inner periphery thereof, and second quenching oil injection nozzles extending axially of the blank and positioned around the outer periphery thereof respectively at locations equidistantly spaced apart circumferentially of the blank. The quenching oil is forced out from the first injection nozzle against the inner peripheral surface of the blank at a pressure of 0.2 to 0.8 kg/cm$^2$, and is similarly forced out from the second injection nozzles against the outer peripheral surface of the blank at a pressure of 1.4 to 2.1 kg/cm$^2$.

After the completion of hardening, the outer race blank is withdrawn from the quenching oil and subjected to a tempering treatment. Finally the inner and outer peripheral surfaces and opposite side faces of the blank are cut and ground as specified. In this way, the outer race is produced.

The numerical values involved in the process for producing the outer race are limited for the following reasons. The components of the steel used are based on the same reasons as previously described for the first embodiment.

Heating Temperature

If the heating temperature is lower than 800° C., it is impossible to give the desired hardness to each of the inner and outer peripheral surfaces of the outer race, while temperatures over 880° C. permit growth of coarse crystal grains and formation of an excess of solid solution of carbide as a second phase in the matrix, failing to afford the required rolling life and resistance to breaking.

Heating Time

If the heating time is shorter than 1 hour, a faulty heat treatment will result due to insufficient soaking, whereas if the heating time is in excess of 3 hours, an increased heat treatment cost will result.

Pressure for Injecting Quenching Oil Against Inner and Outer Peripheries of Outer Race Blank If the pressure for injecting the quenching oil against the inner and outer peripheral surfaces of the outer race blank is less than the lower limit value, the desired hardness can not be given to the inner and outer peripheral surfaces of the outer race, whereas if the pressure is in excess of the upper limit value, the interior of the race is given an excessive hardness of greater than 45 in HRC. The injection pressure is the pressure at the orifice of the injection nozzle. The orifices of the nozzles for forcing out the quenching oil against the outer peripheral surface of the outer race blank are preferably at a distance of 150 to 300 mm, more preferably at a distance of 200 to 250 mm, from the outer peripheral surface of the blank.

Next, an example is given below for the second embodiment of the invention.

A hollow cylindrical outer race blank, 300 mm in outside diameter, 218 mm in inside diameter and 173 mm in length, was prepared from a steel containing 1.02 wt. % of C, 0.55 wt. % of Si, 1.01 wt. % of Mn, 0.015 wt. % of P, 0.003 wt. % of S, 0.09 wt. % of Cu, 0.07 wt. % of Ni, 1.10 wt. % of Cr and 0.02 wt. % of Mo, the balance being Fe and inevitable impurities.

The outer race blank was then heated at 860° C. for 90 minutes and thereafter immersed in a quenching oil comprising Master Quench A and having a temperature of 80° C. for hardening while injecting the quenching oil into the oil bath from a first quenching oil injection nozzle against the inner peripheral surface of the blank at a pressure of 0.65 kg/cm$^2$, and similarly injecting the quenching oil from second quenching oil injection nozzles against the outer peripheral surface of the blank 10 at a pressure of 1.9 kg/cm$^2$. The second injection nozzles 13 were eight in number, oil quenching time was 6 minutes and quenching oil injection time was 6 minutes.

After the completion of hardening, the outer race blank was withdrawn from the quenching oil and heated at 200° C.

for 5 hours for tempering. The inner and outer peripheral surfaces and opposite side faces of the blank were thereafter cut and ground as specified.

Figure 6:
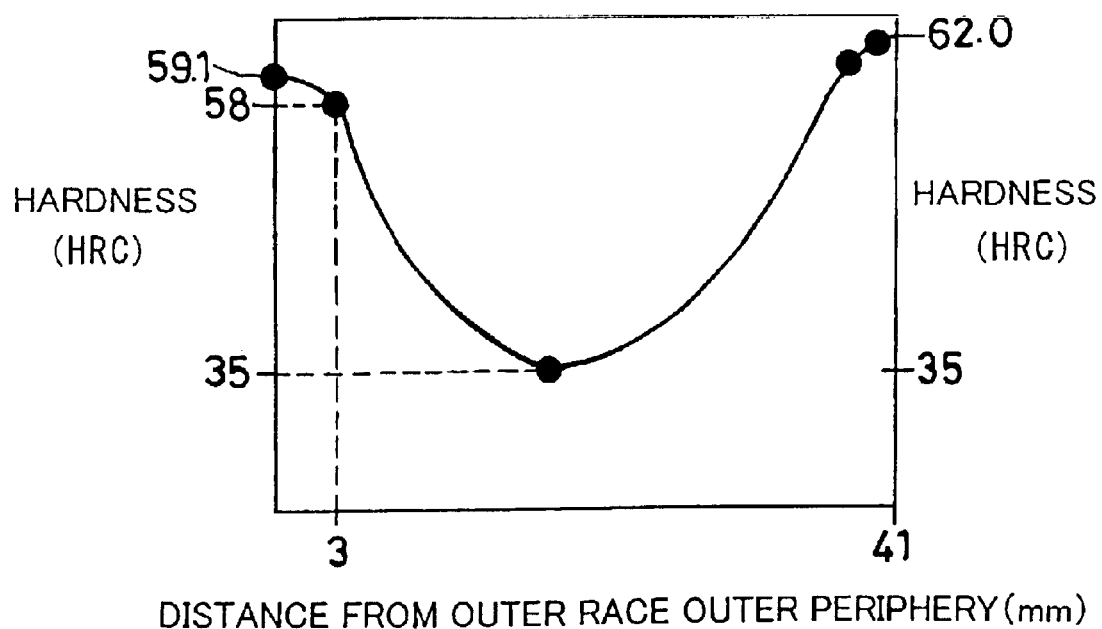
FIG. 6 is a graph showing a distribution of hardnesses in an outer race produced in an example of the second embodiment.

The distribution of hardnesses was measured of the outer race 20 thus produced, in the portion thereof from the outer peripheral surface 22 to the inner peripheral surface 21 at the center of the length of the race. As apparent from FIG. 6 showing the result, the outer peripheral surface 22 had a hardness of 59.1 in HRC, the portion having a depth of 3 mm from the outer peripheral surface had a hardness of 58.0 in HRC, the inner peripheral surface had a hardness of 62.0 in HRC, and the center of the thickness of the race had a hardness of 35 in HRC. Furthermore, the portion 23 having a depth of 3 mm from the outer peripheral surface 22 contained 14 vol. % of retained austenite.

Inner races and cylindrical rollers were prepared. The raceway surface of each inner race had a surface hardness of 62.3 in HRC and an effective hardened layer having a depth of 1 mm and a hardness of 61 to 62.3 in HRC, the effective hardened layer containing 21 vol. % of retained austenite and having a compressive residual stress of 186 MPa. The rolling surfaces of the rollers had a surface hardness of 63.0 in HRC. These inner races and rollers, and outer races 20 produced in the manner described above were used to assemble antifriction bearings, which were then incorporated into a multistage rolling machine with the outer races 20 serving as backup rolls. In this case, the outer races 20 were found free from breaks or plastic deformation, with no faults found in the inner and outer races and in the rollers, even after 6 months of use, i.e., even after the period of use necessitating inspection and replacement when conventional outer races were used.

What is claimed is:

1. An antifriction bearing comprising an inner race, an outer race having an outer peripheral surface to be brought into contact with other member for use as a roll, and a plurality of rolling elements arranged between the inner and outer races, the bearing being characterized in that a portion of the outer race from an outer peripheral surface thereof to a depth of 3 mm has a hardness of 58 to 62 in Rockwell C hardness (hereinafter referred to as "HRC") and a hardness gradient of up to 1 HRC/1 mm from the outer peripheral surface inward, the depth portion containing 5 to 18 vol. % of retained austenite, a portion of the outer race from an inner peripheral surface thereof to a depth of 1 mm having a hardness of 61 to 64 in HRC and containing 5 to 15 vol. % of retained austenite, a center portion of the thickness of the outer race between the inner and outer peripheral surfaces thereof having a hardness of 35 to 42 in HRC.

2. An antifriction bearing according to claim 1 wherein an end face of the outer race has a surface hardness of 45 to 59 in HRC except at an end face annular portion having a width of 3 mm from an outer periphery thereof and at an end face annular portion having a width of 1 mm from an inner periphery thereof.

3. An antifriction bearing comprising an inner race having an outer peripheral surface serving as a raceway surface, an outer race having an inner peripheral surface serving as a raceway surface and an outer peripheral surface to be brought into contact with other member for use as a roll, and a plurality of rolling elements arranged between the inner and outer races, the bearing being characterized in that the raceway surface of the inner race and the rolling surfaces of the rolling elements each have a surface hardness of 61 to 65 in Rockwell hardness C (HRC) and an effective hardened layer having a depth of at least 0.35 mm and a hardness of 61 to 65 in HRC, the effective hardened layer containing 15 to 35 vol. % of retained austenite and having a compressive residual stress of at least 100 MPa, the outer race being made of a bearing steel, the raceway surface of the outer race being smaller than the rolling surfaces of the rolling elements in surface hardness, a portion of the outer race from the outer peripheral surface thereof to a depth of 3 mm having a hardness of 58 to 62 in HRC and containing 5 to 18 vol. % of retained austenite, a center portion of the thickness of the outer race between the inner and outer peripheral surfaces thereof having a hardness of 30 to 45 in HRC.

* * * * *